May 27, 1958     E. S. WHITE     2,835,921
MOLD CONSTRUCTION
Filed Aug. 27, 1953     5 Sheets-Sheet 1
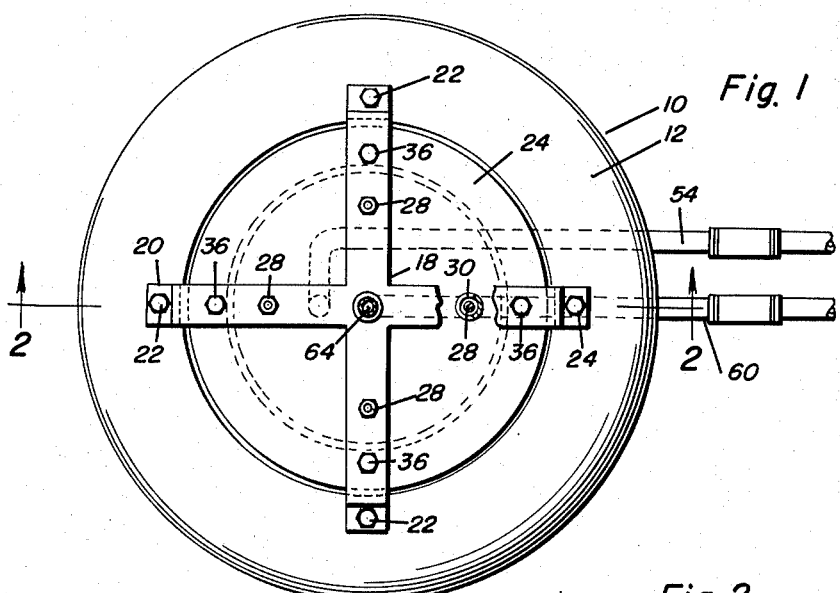
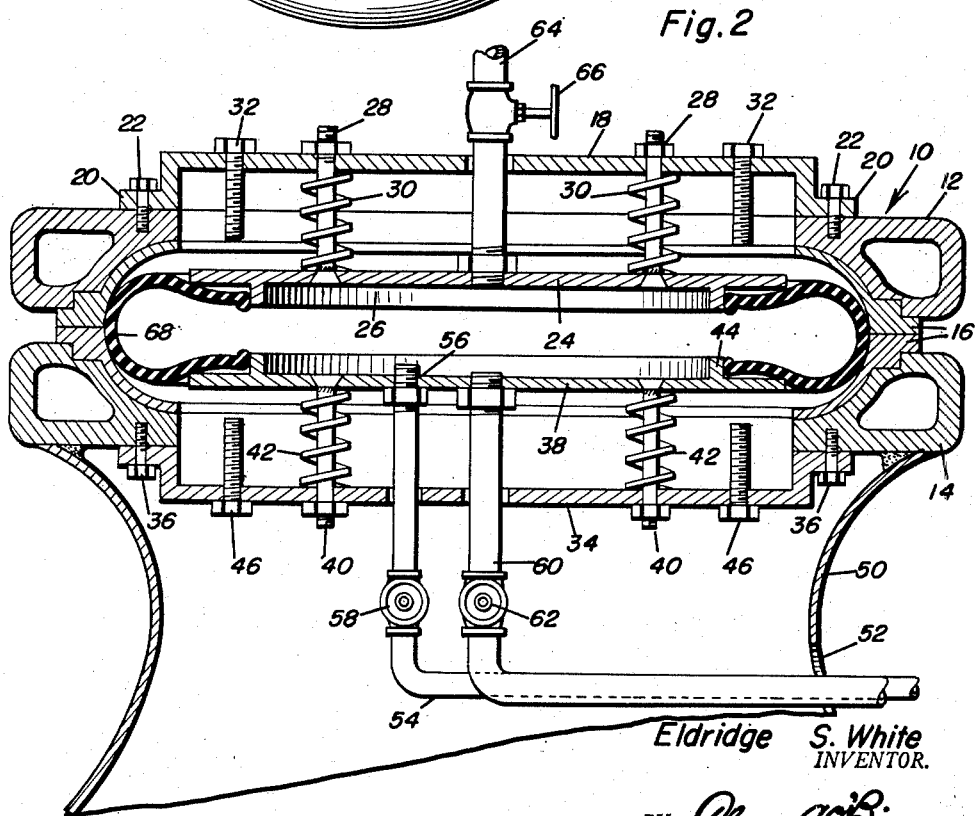
Eldridge S. White
INVENTOR.

May 27, 1958
E. S. WHITE
2,835,921
MOLD CONSTRUCTION
Filed Aug. 27, 1953
5 Sheets-Sheet 2
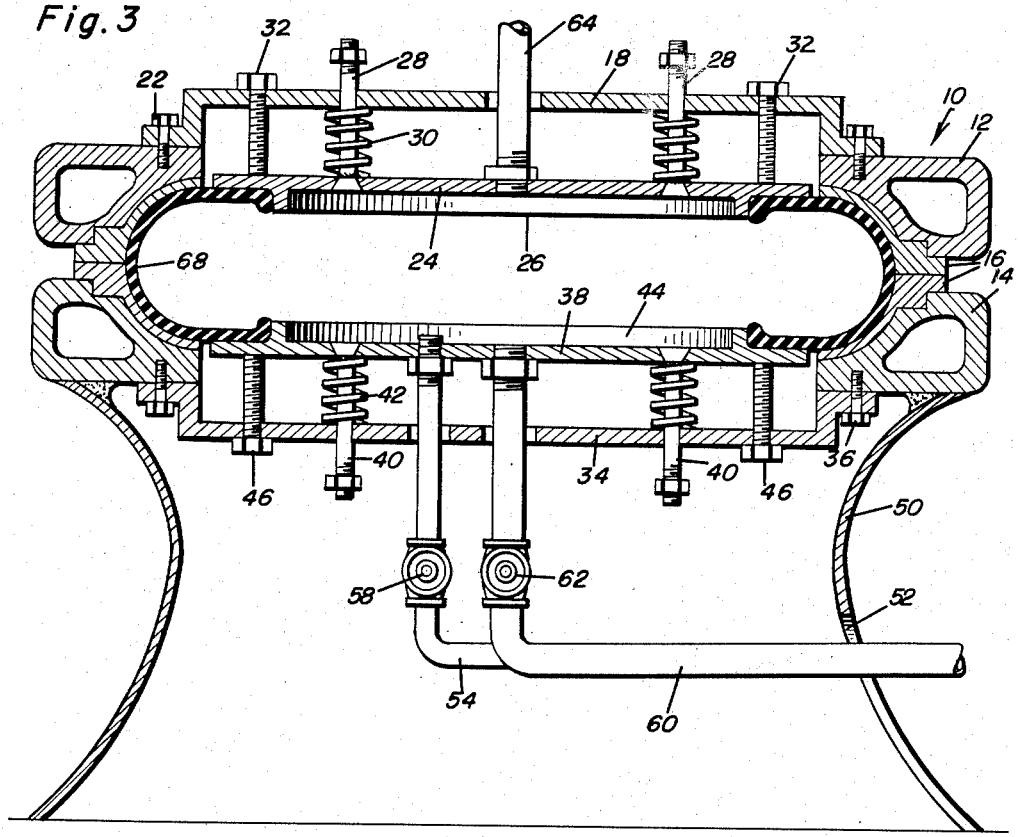
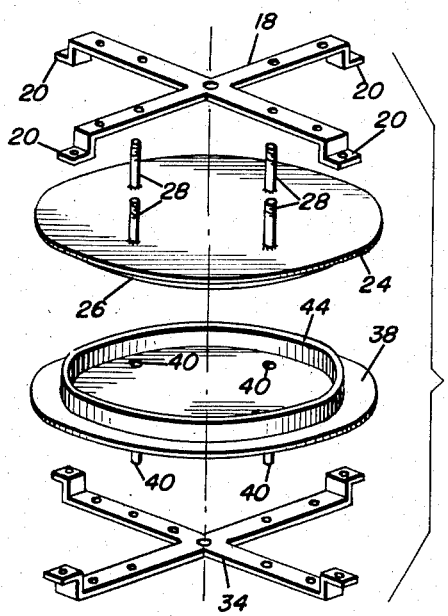
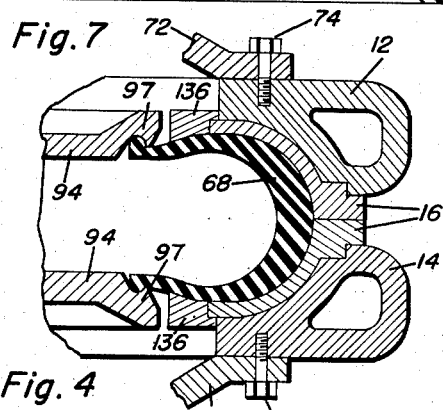
Eldridge S. White
INVENTOR.
BY *Clarence A. O'Brien*
*and Harvey B. Jackson*
Attorneys May 27, 1958  E. S. WHITE  2,835,921
MOLD CONSTRUCTION
Filed Aug. 27, 1953  5 Sheets-Sheet 3

Eldridge S. White
INVENTOR.

Eldridge S. White
INVENTOR.

May 27, 1958

E. S. WHITE 2,835,921

MOLD CONSTRUCTION

Filed Aug. 27, 1953

Eldridge S. White
INVENTOR.

BY *Clarence A. O'Brien*
*and Harvey B. Jackson*
Attorneys

# United States Patent Office 2,835,921
Patented May 27, 1958

2,835,921

MOLD CONSTRUCTION

Eldridge S. White, Florence, Ala., assignor to Robbins Tire & Rubber Company, Inc., Tuscumbia, Ala., a corporation of Alabama Application August 27, 1953, Serial No. 376,804

7 Claims. (Cl. 18—18)

This invention relates in general to an improved mold construction, and more specifically to a mold construction for curing tires in a retreading process.

At the present time when tires are to be cured in molds under pressure during a retreading operation, it is necessary to first mount the tire to be cured on a curing rim with a curing tube disposed therein. Also, after the curing process is completed it is then necessary to remove the curing tube and rim. It will be understood that the mounting and demounting of the tire is a time consuming process and its elimination would materially reduce the cost of a retreading operation.

It is therefore the primary object of this invention to provide an improved mold construction for use in the curing of tires during a retreading operation, said mold construction being such that tires may be placed therein without mounting the same on a rim and without utilizing a curing tube, the mold construction including a device engaging the sides and beads of tires to form a quick seal therewith.

Another object of this invention is to provide a device for attachment to curing molds which are resiliently engaged with sides and beadings of tire casings to form a seal therewith whereby a tire mounted in a mold carrying such device may be inflated without the use of a curing tube.

Another object of this invention is to provide an improved device for attachment to curing molds for tires, said device being of relatively simple construction and formed of readily obtainable material so as to be economically feasible and at the same time providing an automatic seal with a tire after the same has been placed in a mold and the mold is in a closed position.

Another object of this invention is to provide an improved device for attachment to existing molds which will automatically engage and form a seal with a tire positioned within the mold so as to eliminate a curing tube and rim normally associated with such mold.

A still further object of this invention is to provide an improved device for attachment to a curing mold which will automatically engage a tire casing and form a seal therewith, the device being provided with means for supplying steam under pressure to an associated tire, the steam both facilitating the curing of the tire and retaining the same in an inflated state.

Yet another object is to provide a simple replacement for the conventional curing tube, which may be inserted into a tire casing to render it fluid tight, whereby air or steam may be supplied to the tire interior for treating the same, and which shall establish an effective fluid tight seal with the tire beads.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of a mold provided with the tire sealing device which is the subject of this invention, and shows the general relationship to the tire sealing device with respect to the mold;

Figure 2 is an enlarged fragmentary sectional view taken substantially on the plane indicated by the section line 2—2 of Figure 1 and shows the general construction of the mold and the device attached therewith, a tire being shown in the mold in a deflated state;

Figure 3 is a sectional view similar to Figure 2 and shows the tire after it has been inflated;

Figure 4 is an exploded perspective view of portions of the tire sealing device and shows the general outline of a plate assembly adapted to engage a tire in sealing relation;

Figure 7 is an enlarged fragmentary vertical sectional view showing the relationship of a tire sealing plate with respect to the beading of an associated tire casing;

Figure 12:
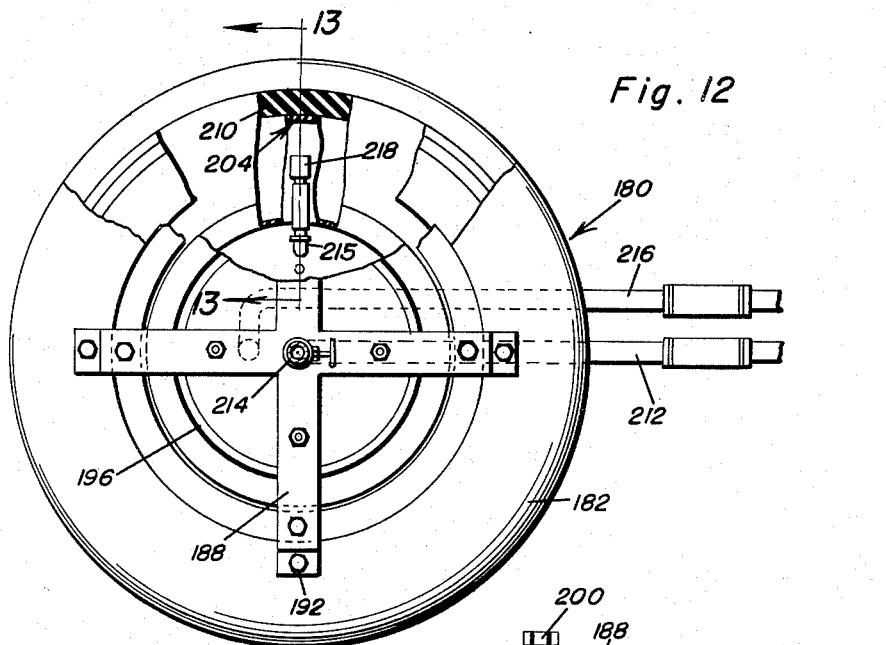
Figure 12 is a top plan view of still another modified form of mold construction, and in which is used a tire liner sleeve, portions of the mold construction being broken away and shown in section in order to clearly illustrate the details thereof.
Figure 13:
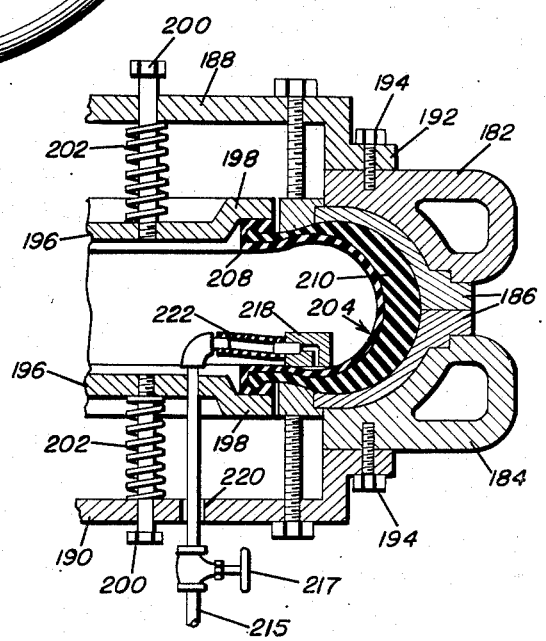
Figure 14:
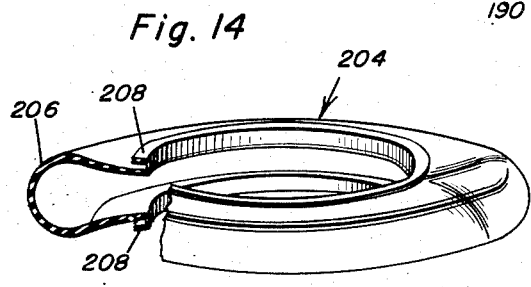

Figure 13 is an enlarged fragmentary vertical sectional view taken substantially on the plane indicated by the section line 13—13 of Figure 12 and shows the particular relationship of a tire mounted within the mold construction of Figure 12 with respect to elements of the mold construction; and Figure 14 is a perspective view of a liner for a tire, the liner, also shown in Figures 12 and 13, having portions thereof broken away and shown in section in order to clearly illustrate the cross section of the liner.

Referring now to the drawings in detail, it will be seen that there is illustrated a curing mold for tires which is referred to in general by the reference numeral 10. The curing mold 10 includes an upper half 12 and a lower half 14 which are hingedly connected together whereby the upper half 12 may be moved out of overlying relation with respect to the lower half 14 to permit the insertion of a tire within the mold. It will be understood that the mold halves 12 and 14 are provided with suitable locking means (not shown) for retaining the same in a closed position.

Removably carried by the upper and lower mold halves 12 and 14 are mold matrices in the form of replaceable inserts 16. It will be understood that the inserts which are in the form of split halves have a particular tread outlined therein and are replaced for various size tires and for various types of tread. It will also be understood that the mold construction outlined above is conventional and in itself is not a part of the present invention.

Carried by the upper mold half 12 in overlying relation is a support 18. As is best illustrated in Figures 1 and 4, the support 18 is generally cruciform in outline. The free ends of the support 18 terminate in vertically offset flanges 20 which directly overlie the upper surface of the upper mold half 12 and which are removably secured thereto by suitable fasteners 22.

Carried by the support 18 in depending relation is a plate 24 which is generally circular in outline and which has an annular ring 26 formed integrally with the underside thereof. The plate 24 is adjustably carried by the support 18 by a plurality of fasteners 28. Each of the fasteners 28 has mounted thereon a spring 30 which is disposed between the support 18 and plate 24 to urge the plate 24 downwardly. Also carried by the support 18 for engagement with the plate 24 is a plurality of adjustable stop members 32.

Carried by the underside of the lower mold half 14 is a support 34 which is identical with the support 18. The support 34 is secured to the lower mold half 14 by fasteners 36 and has supported thereby in overlying relation a plate 38, which the plate 38 is identical with the plate 24, is adjustably secured to the support 34 by a plurality of fasteners 40. Carried by the fasteners 40 between the support 34 and the plate 38 are springs 42 which urge the plate 38 to an uppermost position.

The plate 38, like the plate 24, is generally circular in outline and has secured to the upper side thereof an annular flange 44. Carried by the support 34 is a plurality of adjustable stop members 46 which are adapted to engage the underside of the plate 38 to limit downward movement thereof.

It will be noted that the lower mold half 14 is supported in an elevated position by a suitable support 50. The support 50 is provided with an enlarged opening 52 through which passes an air line 54, which has an end thereof threadedly engaged in a bore 56 in the plate 38 and communicates with the space between the plates 24 and 38. The air line 56 also includes a valve 58 which controls the flow of air into the space between the plates 24 and 38.

Also connected to the plate 38 and communicating the the space between the plates 24 and 38 is a steam inlet line 60. The flow of steam through the steam inlet line 60 is controlled by a valve 62 and the steam inlet line passes outwardly through the opening 52 in the base 50 and is connected to a suitable steam source.

The plate 24 has secured thereto a steam outlet line 64 which passes through the plate 24 and communicates with the space between the plates 24 and 38. Flow of steam through the steam outline 64 is controlled by a valve 66.

While the lines 60 and 64 have been expressly described as being outlet and inlet lines, respectively, it will be understood that the relationship of the lines may be reversed if it is so desired.

When a tire, such as the tire 68 is positioned in the mold 10 for curing, the annular rings 26 and 44 engage the free edges of the beadings of the tire and the inner surfaces of the plates 24 and 38 engage the sides of the tire. The valve 58 is then opened with the result that compressed air enters the space between the plates 24 and 38. The entrance of compressed air into this space results in the inflation of the tire 68 due to the sealing relationship thereof with the plates 24 and 38 and the annular rings 26 and 44.

After the tire 68 is properly inflated, the valve 58 may then be closed and the valves 62 and 66 opened. It will be understood that although the steam is permitted to escape from the space between the plates 24 and 38, the pressure within such space is sufficient to retain the tire 68 in its inflated state as is best illustrated in Figure 3. Accordingly, steam entering the interior of the tire 64 from the steam inlet line 60 both retains the tire 68 in an inflated state and at the same time facilitates curing of the tire.

Referring now to Figure 3 in particular, it will be seen that the tire 68 is illustrated in its inflated state. At this time the free edges of the beadings of the tire are tightly engaged with the annular rings 26 and 44. Also, the side walls of the tire 68 are engaged with the inner surfaces of the plates 24 and 38 surrounding the annular rings 26 and 44, respectively. It will be noted that the plates 24 and 38 have now moved outwardly against the inward urging of the springs 30 and 42, respectively. It will also be noted that outward movement of the plates 24 and 38 have been limited by the adjustable stops 32 and 46, respectively. When the plates 24 and 38 are in their outermost positions, the tire 68 is in its normal inflated state and is properly shaped.

It will be understood that the curing of a tire in the mold construction 10 will produce the same results as a curing operation in a conventional mold now being utilized and that the curing process may be accomplished without the use of a curing tube and rim.

Figures 5, 6:
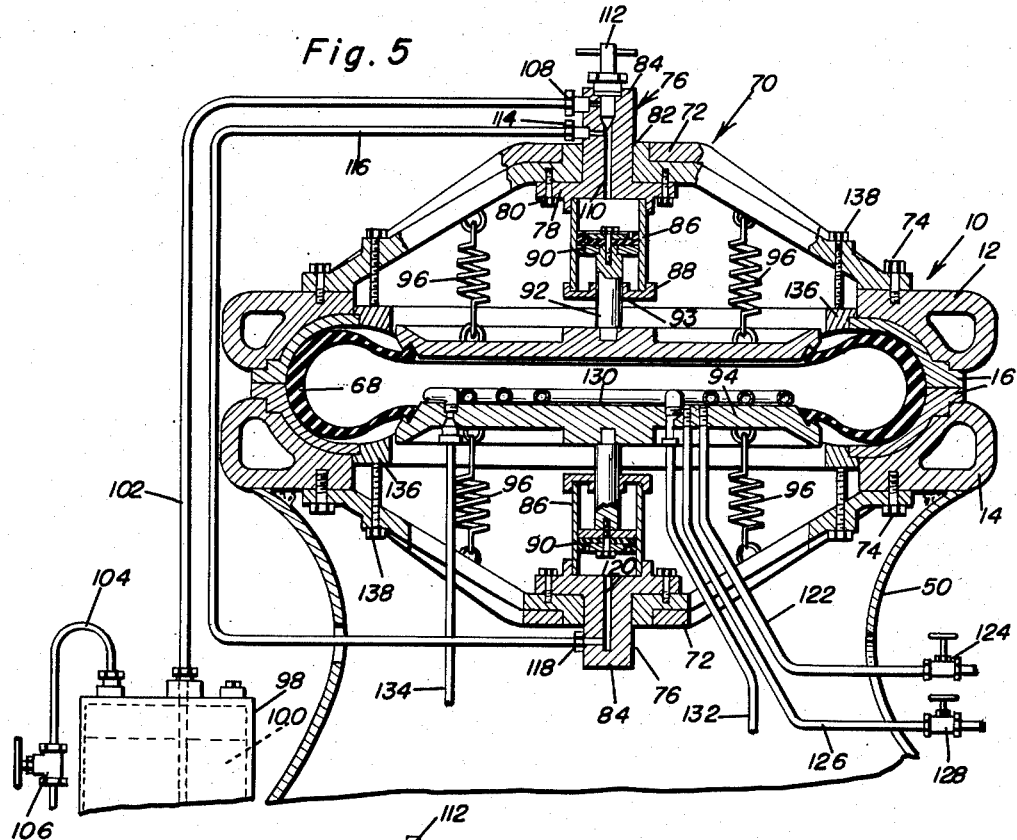
Figure 5 is a vertical sectional view through a mold provided with a modified form of tire sealing device and shows the relationship of the tire sealing device with respect to the mold, the tire sealing device being in an initial tire engaging position.
Figure 6 is a fragmentary vertical sectional view similar to Figure 5 and shows the tire sealing device in engagement with a tire casing when the same is inflated.

Referring now to Figures 5 and 6 in particular, it will be seen that the tire curing mold 10 is provided with a modified form of tire sealing device which is referred to in general by the reference numeral 70. The tire sealing device 70 includes identical arched supports 72 which are secured to the upper and lower mold halves 12 and 14 by suitable fasteners 74. Each of the arched supports is provided with an inwardly directed fluid cylinder which is referred to in general by the reference numeral 76. The fluid cylinder 76 for each of the arch supports 72 includes a mounting flange 78 which is secured to the inner surface of its associated arched support 72 by suitable fasteners 80. Formed integrally with the mounting flange 78 and extending through a centrally located opening 82 in the arched support 72 is a stem portion 84.

The fluid cylinder 76 also includes a cylinder 86 which is carried by the mounting flange 78. The other end of the cylinder 86 is closed by a cap 88. Mounted within the cylinder 86 for vertical movement is a piston 90 which has secured thereto a piston rod 92. The piston rod 92 passes through an opening 93 in the cap 88.

Secured to each of the other ends of the piston rods 92 are annular plates 94 which are intended to engage in sealing relation with a beading of a tire casing 68 mounted within the mold 10. The plates 94 are urged away from the center of the mold 10 by the springs 96 which connect the same to the arched support 72 and urge the plates 94 toward such arched support.

As is best illustrated in Figure 7, each of the plates 94 is provided with an offset pointed outer annular flange 97 which is shaped to engage behind a projection of the beading of the tire casing 68. It thus will be seen that when the tire 68 is expanded the beading thereof will move into sealing engagement with the plates 94.

Referring again to Figure 5 in particular, it will be seen that mounted closely adjacent the base 50 of the mold 10 is a closed container 98. The container 98 is partially filled with a suitable liquid 100 which has extending down into it a hydraulic conduit 102. The container 98 also has connected to a top wall thereof an air line 104. The application of air to the container 98 is controlled by a valve 106. It will thus be seen that when the valve 106 is opened, air under pressure will enter the container 98 to force the liquid 100 under pressure into the hydraulic conduit 102 where it is supplied to a fitting 108 connected to the upper end of the stem portion 84 of the uppermost fluid cylinder 76. The fitting 108 is in communication with a vertical fluid passage 110 in the stem portion whose other end communicates with the interior of the associated cylinder 86. Flow of fluid from the fitting 108 into the fluid passage 110 is controlled by a needle valve 112.

Also communicated with the fluid passage 110 is a fitting 114 which connects a hydraulic conduit 116 to the stem portion 84 of the uppermost fluid cylinder 76. The other end of the hydraulic conduit 116 is connected by a fitting 118 to the stem portion 84 of the lowermost fluid cylinder 76. Communicating with the fitting 118 is a fluid passage 120 in the stem portion 84 of the lowermost fluid cylinder 76 which supplies the liquid 100 to the associated cylinder 86. Thus, it will be seen that when the needle valve 112 is actuated the two fluid cylinders 76 will be controlled.

Extending through the lowermost plate 94 and communicating with the space between the two plates 94 is an air supply line 122. Flow of air through the air supply line 122 is controlled by a valve 124. Also passing through and secured to the lowermost plate 94 is an air outlet line 126 which is controlled by a valve 128.

In operation of the tire sealing device 70, the tire casing 68 is positioned within the mold 10. The valve 106 and the needle valve 112 are then opened so as to cause inward movement of the pistons 90. This results in inward movement of the plates 94 towards each other and into sealing engagement with the beadings of the tire casing 68. When the plates 94 are so positioned, the valve 124 is opened and air is applied under pressure to the interior of the tire casing 68. As the tire casing 68 expands, the needle valve 112 is gradually opened to permit the escape of liquid from the cylinders 86 and the upward movement of the pistons 90 so that the plates 94 may move outwardly to the positions illustrated in Figure 6. The cylinder and piston assemblies thus constitute hydraulic, adjustably yieldable abutments for the plates 94. When the plates are so positioned, the tire casing 68 is ready to be cured.

Curing of the tire casing 68 is accomplished by a steam coil 130 carried by the inner face of the lowermost plate 94. The steam coil is provided with a steam supply line 132 and a steam escape line 134 so that steam can be continuously circulated therethrough to heat the interior of the tire casing 68 and facilitate curing thereof.

It will be noted that the mold inserts 16 are supplemented by a pair of spaced annular rings 136 which form continuations thereof. The annular rings 136 are supported from the arched supports 72 by suitable fasteners 138.

After the tire casing 68 has been cured, the valve 106 is again opened with the valve 112 being opened so as to cause movement of the plates 94 towards each other. Movement of the plates 94 towards each other results in the breaking loose of the tire casing 68 from the mold inserts 16. The valve 106 may then be closed and the plates 94 permitted to move outwardly by the springs 96 so that the tire casing 68 may be conveniently removed from the mold 10 when the halves thereof are opened.

Figure 8:
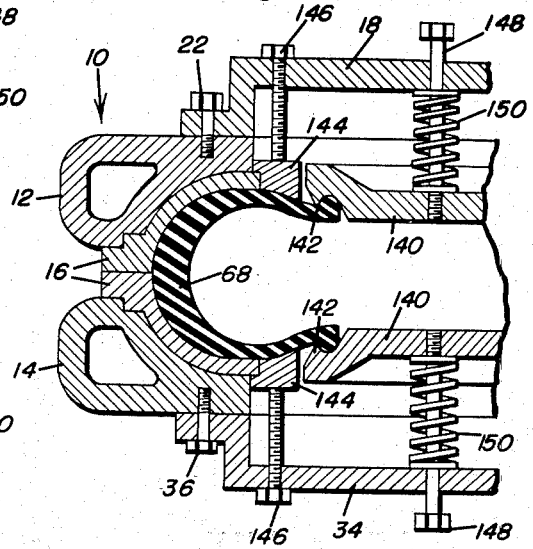
Figure 8 is a fragmentary sectional view of a modified form somewhat similar to Figure 7 and shows a similar relationship between a tire sealing plate and the beading of a tire casing with the plate being of the form utilized in the form of tire sealing device illustrated in Figures 1 through 4, inclusive.

Referring now to Figure 8 in particular, it will be seen that the tire sealing device of Figures 1, 2 and 3 has been provided with a modified form of tire engaging plate 140. The plate 140 is identical with the plate 94 in outline and includes an outer offset pointed annular flange 142 which engages behind an outwardly projecting portion of the beading of the tire casing 68 to form a seal therewith.

When utilizing the plates 140, the inserts 16 are supplemented by annular rings 144 which are adjustably supported from the supports 18 and 34 by bolt fasteners 146.

The plates 140 are guidingly supported relative to the supports 18 and 34 by elongated fasteners 148. Carried by the fasteners 148 are coil springs 150 which resist outward movement of the plates 140. If desired, the supports 18 and 34 may also be provided with stop members (not shown) which may be similar to the adjustable stop members 32 and which engage the plates 140 to limit outward movement thereof.

Figure 9:
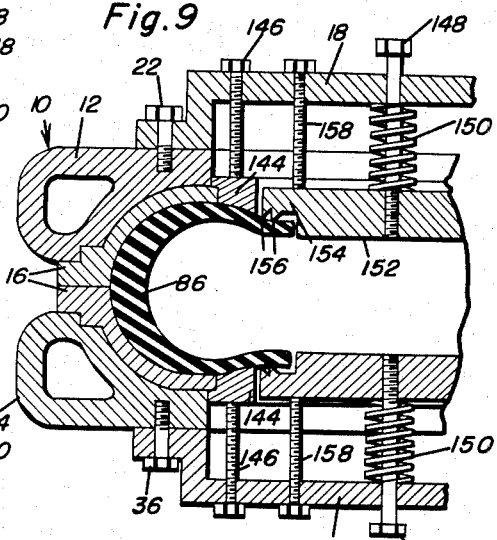
Figure 9 is a fragmentary sectional view similar to Figure 8 and shows a modified form of tire sealing plate.

Referring now to Figure 9 in particular, it will be seen that there is illustrated a modified form of plate construction used in combination with the supports 18 and 34, the plates being referred to in general by the reference character 152. It will be noted that the plates are supported by the bolt fasteners 148 and that they have outer rim portions 154 of reduced thickness. Formed integrally with the rim portions 154 and projecting inwardly therefrom are pointed annular ribs 156. The ribs 156 are intended to engage the outer sides of a tire casing 68 to form a seal therewith. Outward movement of the plates 152 are limited by adjustable, bolt stop members 158.

Figure 11:
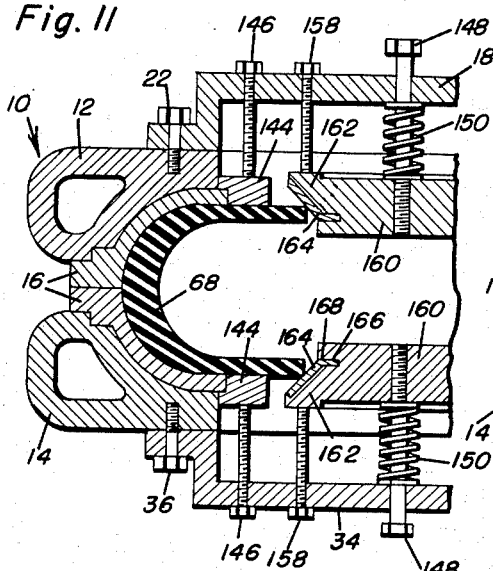
Figure 11 is a fragmentary vertical sectional view showing a further form of tire sealing plate.

Referring now to Figure 11 in particular, it will be seen that there is illustrated still another modified form of plate construction, the individual plates being referred to by reference numeral 160. The plates 160 are supported from the supports 18 and 34 by the adjustable, bolt fasteners 148 which are surrounded by the springs 150 and function substantially the same as the plates 140, and 152. However, the plates 160 have mitered outer rim portions 162 which have secured thereto annular resilient pads 164. The resilient pads 164 overlie the mitered rim portions 162 and have inner edges 166 seated in recesses 168 in the plates 160.

It will be seen that the plates 160 can accommodate various sizes of tire casings 68 inasmuch as the beadings of the tire casings will engage the resilient pads 164 along selected points thereof. Inasmuch as the pads 164 are formed of resilient material, it will be seen that a suitable seal will be obtained between them and the beadings of the tire casing 68.

Figure 10:
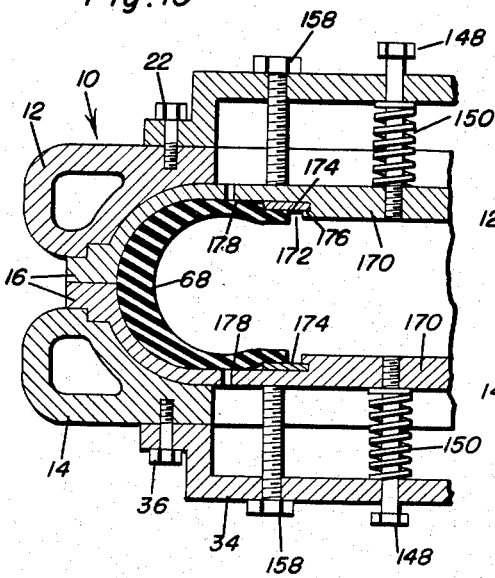
Figure 10 is a fragmentary vertical sectional view similar to Figure 8 and shows still another modified form of sealing relationship between a tire casing and a tire sealing plate.

Referring now to Figure 10 in particular, it will be seen that there is illustrated a still further modified form of plate construction, the individual plates being referred to by the reference numeral 170. Each plate 170 is provided with an outer annular rabbet 172 in which is seated a resilient annular pad 174. The pad 174 has an inner edge thereof seated in a recess 176 in the plate 170 communicating with the rabbet 172. It is intended that the resilient pad 174 engage the sides of beadings of the tire casing 68 to form a seal therewith.

It will be noted that the plates 170 are of such an extent that the outer edge portions thereof engage the side walls of the tire casing 68 as at 178 to partially support the same. Due to this particular relationship, the rings 144 are not necessary and are omitted. However, the supports 18 and 34 are provided with the adjustable, bolt stop members 158 to limit outward movement of the plates 170. While the various types of plates have been associated with certain of the tire sealing devices, it will be understood that the plates are so designed whereby they may be utilized with any one of the different types of tire sealing devices. Accordingly, it is not intended to limit the invention to the particular relation of the plates illustrated and described above.

Referring now to Figures 12, 13 and 14 in particular, it will be seen that there is illustrated a still further modified form of mold construction which is referred to in general by the reference numeral 180. The mold construction 180 includes an upper mold half 182 and a lower mold half 184 which are suitably hingedly connected together. Removably carried by the upper and lower mold halves 182 and 184 are replaceable inserts 186. Also carried by the mold halves 182 and 184 are supports 188 and 190, respectively, the supports being cruciform in outline and having free ends terminating in vertically offset flanges 192 which are secured to their respective mold halves by suitable fasteners 194.

Carried by the supports 188 and 190 are plates 196 which are circular in outline and which have offset peripheral portions 198. The plates 196 are retained relative to the supports 188, 190 by elongated adjustable, bolt fasteners 200 and are urged inwardly towards each other by coil springs 202 carried by the fasteners 200.

Referring now to Figure 14 in particular, it will be seen that there is illustrated a liner which is referred to in general by the reference numeral 204. The liner 204 has the same general configuration as the interior of a tire for which it is intended and includes a body portion 206 which terminates in a pair of annular rim hook portions 208. It will be noted that when the liner 204 is properly positioned within a tire, such as the tire 210, the hook portions 208 engage over beads of the tire 210. Also, the hook portions 208 are in engagement with the inner surfaces of the offset peripheral portions 198 of the plates 196. It will be understood that the liner 204 is intended to be utilized with tires having minute openings therethrough so as not to be able to hold pressure. In the event the liner 204 is not required, the beads of the tire 210 will then engage the offset peripheral portions 198 to form a seal therewith.

Although the liner 204 has been illustrated and described in combination with the mold construction 180, it will be understood that the mold construction may be slightly varied and may be of the construction illustrated in the other figures of this application.

It will be understood that the mold construction 180 is similar to the mold construction of Figure 2 and that it is provided with a steam inlet line 212 and a steam outlet line 214. It is also provided with an air pressure line 216. Inasmuch as steam is passed through the space between the plates 196 and within the confines of the tire 210, condensate will form within this space. It is highly desirable that all condensate be eliminated so as to facilitate the tearing of the tire. Accordingly, there is provided a vacuum line 215. The vacuum line 215 includes a suitable shut off valve 217 and a suction head 218. The vacuum line 215 passes through a bore 220 in the support 190 and is rigidly carried by the lower plate 196. In order to facilitate constant engagement of the suction head 218 with either the liner 204 or the interior of the tire, such as the tire 210, a suction head 218 is connected to the inner end of the vacuum line 215 by a flexible conduit 222. It will be readily apparent that when the valve 217 is open, condensate will be drawn up into the suction head 218 and out of the space between the plates 196.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A device for use with a tire retreading mold of the type having two relatively movable annular mold sections with a central opening through each section whereby to receive within said sections a tire to be retreaded with the beads of the tire projecting into the central openings of said section; said device comprising a pair of supports, means rigidly securing each support to a mold section in a position overlying the central opening thereof, a tire engaging plate of less diameter than the central opening in said sections and adjustably carried by each support, means on each plate for sealing engagement with the exterior surface only of the bead of a tire, means carried by each support urging the associated plate into a tire engaging position, stop means carried by each support for limiting outward movement of the associated plate whereby to maintain the shape of an inflated tire in said mold.

2. The combination of claim 1 including fluid pressure inlet and outlet means carried by said plates and communicating with the space between said plates and the interior of a tire.

3. The combination of claim 1 wherein said sealing means includes an annular ring carried by each plate, said annular ring being of such size as to engage the inner peripheral edge of a tire bead.

4. The combination of claim 1 wherein each plate has a flat annular surface and an annular ring bounding said surface, said surface and ring being of such size as to engage the exterior surface and the inner peripheral edge respectively of the bead of a tire.

5. The combination of claim 1 wherein each support includes a cruciform member having integral radially projecting bars, said securing means fastening the outer end of each bar to a mold section, each plate having studs extending through apertures in said bars, said urging means comprising springs surrounding said studs and engaging said bars and plates.

6. The combination of claim 1 including fluid pressure inlet and outlet means carried by said plates and communicating with the space between said plates and the interior of a tire, each support includes a cruciform member having integral radially projecting bars, said securing means fastening the outer end of each bar to a mold section, each plate having studs extending through apertures in said bars, said urging means comprising springs surrounding said studs and engaging said bars and plates.

7. The combination of claim 1 including fluid pressure inlet and outlet means carried by said plates and communicating with the space between said plates and the interior of a tire, each support includes a cruciform member having integral radially projecting bars, said securing means fastening the outer end of each bar to a mold section, each plate having studs extending through apertures in said bars, said urging means comprising springs surrounding said studs and engaging said bars and plates, said supports including central openings therethrough, said inlet and outlet means including conduits extending through said openings.

References Cited in the file of this patent

UNITED STATES PATENTS

| | | |
|---|---|---|
| 1,989,363 | Iverson | Jan. 29, 1935 |
| 2,279,540 | Voth et al. | Apr. 14, 1942 |
| 2,443,955 | Guzik | June 22, 1948 |
| 2,593,137 | Glynn | Apr. 15, 1952 |
| 2,672,651 | Smyser | Mar. 23, 1954 |